United States Patent [19]

Limburg

[11] 3,981,848
[45] Sept. 21, 1976

[54] PHOTOCONDUCTIVE COMPOSITIONS AND IMAGING MEMBERS AND METHODS EMPLOYING SAME

[75] Inventor: William W. Limburg, Penfield, N.Y.

[73] Assignee: Xerox Corporation, Stamford, Conn.

[22] Filed: Feb. 20, 1974

[21] Appl. No.: 444,215

Related U.S. Application Data

[63] Continuation-in-part of Ser. No. 374,187, June 27, 1973, abandoned.

[52] U.S. Cl. .................................. 526/263; 96/1.5; 260/30.4 N; 260/32.8 N; 260/33.6 UA; 428/500; 526/279; 526/280; 526/300; 526/328
[51] Int. Cl.² .................... C08F 22/30; C08F 26/12
[58] Field of Search ............... 260/88.3 R, 78.4 N, 260/78.5 N

[56] References Cited
UNITED STATES PATENTS

| | | | |
|---|---|---|---|
| 3,155,503 | 11/1964 | Cassiers et al. | 260/88.3 R |
| 3,583,869 | 6/1971 | Tubuko et al. | 260/88.3 R |
| 3,697,264 | 10/1972 | Podhajny | 260/88.3 R |
| 3,850,629 | 11/1974 | Ogo et al. | 260/88.3 R |
| 3,883,488 | 5/1975 | Pearson et al. | 260/78.4 N |

Primary Examiner—Harry Wong, Jr.
Attorney, Agent, or Firm—James J. Ralabate; Michael H. Shanahan; John H. Faro

[57] ABSTRACT

Photoconductive composition comprising a carbazole functional polymer wherein at least 0.1 percent of said carbazole function groups have the following structural formula

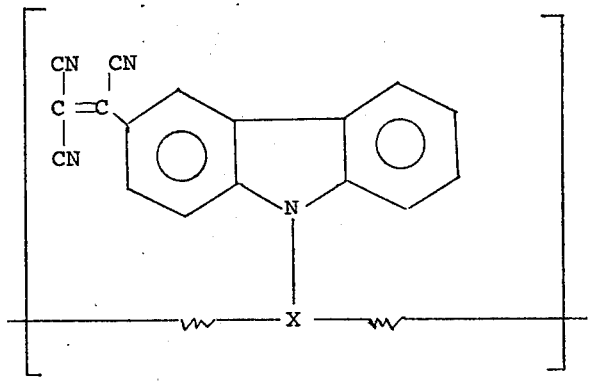

wherein X is a structural unit of said polymer.

Materials of the above structural formula can be readily polymerized or copolymerized with other addition polymers. These polymer compositions are useful in preparation of photoconductive insulating layers for electrophotography.

5 Claims, 1 Drawing Figure

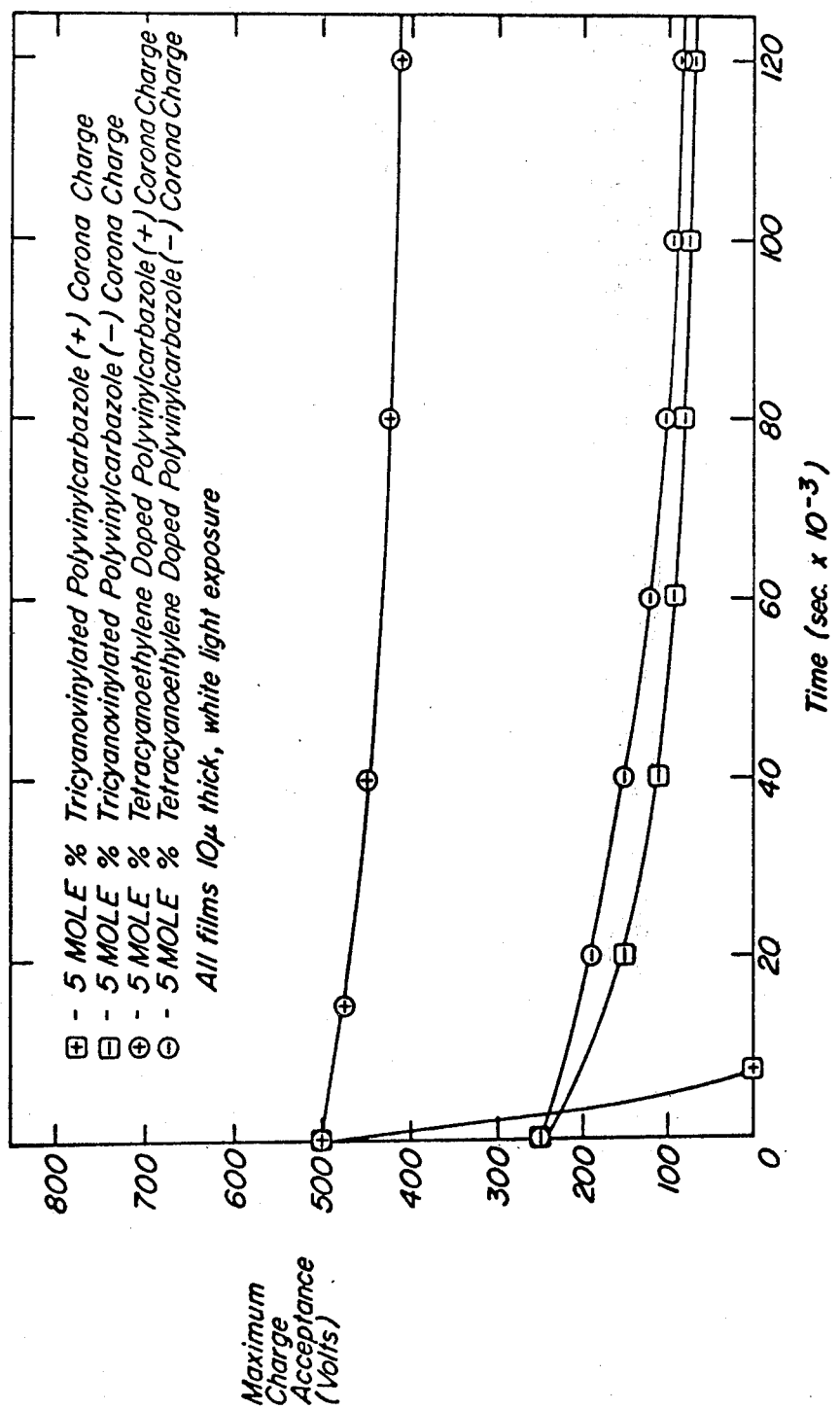

PHOTOCONDUCTIVE COMPOSITIONS AND IMAGING MEMBERS AND METHODS EMPLOYING SAME

CROSS-REFERENCE TO RELATED APPLICATION

This application is a continuation-in-part of application Ser. No. 374,187, filed June 27, 1973 (now abandoned).

BACKGROUND OF THE INVENTION

1. Field of the Invention

This invention relates to organic polymeric photoconductive compositions and the use of such compositions in electrophotographic imaging members and methods. More specifically, this invention concerns itself with inherently photoconductive compositions which are characterized by their high extinction coefficients and good spectral response at wavelengths of from about 4,200 – 6,200 A.

2. Description of the Prior Art

The formation and development of images on the imaging surfaces of photoconductive materials by electrostatic means is well known. The best known of the commercial processes, more commonly known as xerography, involves forming a latent electrostatic image on the imaging surface of an imaging member by first uniformly electrostatically charging the surface of the imaging layer in the dark and then exposing this electrostatically charged surface to a light and shadow image. The light struck areas of the imaging layer are thus rendered conductive and the electrostatic charge selectively dissipated in these irradiated areas. After the photoconductor is exposed, the latent electrostatic image on this image bearing surface is rendered visible by development with a finely divided colored electroscopic material, known in the art as "toner". This toner will be principally attracted to those areas on the image bearing surface which retain the electrostatic charge and thus form a visible powder image.

The developed image can then be read or permanently affixed to the photoconductor where the imaging layer is not to be resued. This latter practice is usually followed with respect to the binder-type photoconductive films (e.g. ZnO) where the photoconductive imaging layer is also an integral part of the finished copy.

In so-called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well known techniques can be used to permanently affix the toner image to the copy sheet, including overcoating with transparent films, and solvent or thermal fusion of the toner particles to the supportive substrate.

In the above "plain paper" copying system, the materials used in the photoconductive layer should preferably be capable of rapid switching from insulating to conductive to insulating state in order to permit cyclic use of the imaging surface. The failure of a material to return to its relatively insulating state prior to the succeeding imaging sequence will result in a decrease in the maximum charge acceptance of the photoconductor. This phenomenon, commonly referred to in the art as "fatigue", has in the past been avoided by the selection of photoconductive materials possessing rapid switching capacity. Typical of the materials suitable for use in such a rapidly cycling system include anthracene, sulfur, selenium and mixtures thereof (U.S. Pat. No. 2,297,691); selenium being preferred because of its superior photosensitivity.

In addition to anthracene, other organic photoconductive materials, most notably, poly(N-vinylcarbazole), have been the focus of increasing interest in electrophotography U.S. Pat. No. 3,037,861. Until recently, neither of these organic materials have received serious consideration as an alternative to such inorganic photoconductors as selenium, due to fabrication difficulties and/or to their relative lack of speed and photosensitivity. The recent discovery that high loadings of 2,4,7-trinitro-9-fluorenone in polyvinylcarbazoles dramatically improves the photoresponsiveness of these polymers has led to a resurgence in interest in organic photoconductive materials, U.S. Pat. No. 3,484,237. Unfortunately, the inclusion of high loadings of such activators can and usually does result in phase separation of the various materials within such compositions. Thus, there will occur within these compositions regions having an excess of activator, regions deficient in activator and regions having the proper stoichiometric relationship of activator to photoconductor. The maximum amount of activator that may be added to most polymeric photoconductive materials without occasioning such phase separation generally will not exceed in excess of about 6 – 8 weight percent.

One method suggested for avoiding the problems inherent in the use of such activators in conjunction with polymeric photoconductors, is the direct incorporation of the activators into the polymeric backbone of the photoconductor, U.S. Pat. No. 3,418,116. In this patent is disclosed the copolymerization of a vinyl monomer having an aromatic and/or heterocyclic substituent capable of an electron donor function with a vinyl monomer having an aromatic and/or heterocyclic substituent capable of an electron acceptor function. The spatial constraint placed upon these centers of differing electron density favors their charge transfer interaction upon the photoexcitation of such a composition. These so-called "intramolecular" charge transfer complexes, more accurately designated "intrachain" charge transfer complexes, are believed to function substantially the same as charge transfer complexes formed between small activator molecules and a photoconductive polymer. The fact that the electron donor function and an electron acceptor function are on a common polymeric backbone does not apparently change the $\pi$ - $\pi$ charge transfer interaction, but merely increases the probability of it occurring. Unfortunately, the preparation of such copolymers from vinyl monomers having an electron donor center and vinyl monomers having an electron acceptor center is often beset with difficulty.

Accordingly, it is the object of this invention to provide a polymeric photoconductive composition which is highly photosensitive and yet relatively easy to prepare.

More specifically, it is the object of this invention to provide a polymeric photoconductive composition capable of an intramolecular charge transfer transition.

It is another object of this invention to provide a polymeric photoconductive composition wherein an electron donor and an electron acceptor center are contained within a single structural unit of the polymer.

It is yet another of the objects of this invention to provide a polymeric photoconductive composition having good spectral response to light in the visible region of the electromagnetic spectrum.

SUMMARY OF THE INVENTION

The above and related objects are accomplished by providing a photoconductive composition comprising a carbazole functional polymer wherein at least 0.1 percent of said carbazole functional groups have the following structural formula

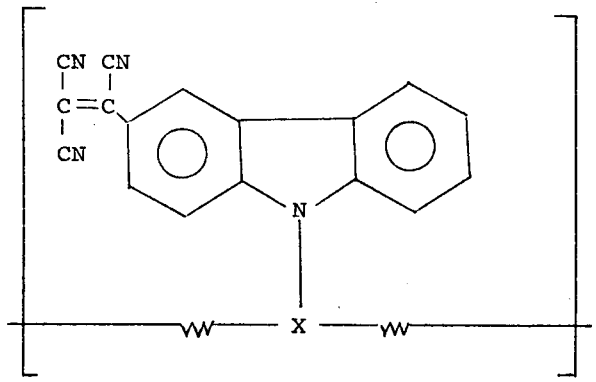

wherein X is a structural unit of said polymer.

With the electron donor and electron acceptor centers being located within a single structural unit of the polymer the electronic transition moment and flow of charge upon photoexcitation are colinear and thus intramolecular charge transfer occurs within this structural unit. The photoresponse of this composition is therefore highly efficient since it is both independent of the relative concentration of electron donor and electron acceptor centers within the composition and substantially independent of a $\pi$ - $\pi$ type charge transfer interaction.

In the preferred embodiments of this invention (a) at least about 15 to about 30% of the carbazole functional groups of the carbazole functional polymer have the hereinbefore described structural formula and (b) the polymeric composition comprises structural units having the hereinbefore described structural formula and structural units from N-vinylcarbazole.

BRIEF DESCRIPTION OF THE DRAWING

FIG. 1 is a graphical illustration of the photodischarge characteristics of a composition of this invention and a conventionally activated photoconductive polymer.

DESCRIPTION OF THE INVENTION INCLUDING PREFERRED EMBODIMENTS

Polymeric photoconductive compositions containing structural units of the type hereinbefore described can be readily prepared from carbazole functional polymers by tricyanovinylation of said carbazole functional groups with tetracyanoethylene under the appropriate process conditions. The starting materials used in this synthesis can be almost virtually any N-carbazole functional polymer provided that the backbone of said polymer does not have other functional groups which are capable of interference with the tricyanovinylation of these carbazole groups or which would substantially adversely effect the charge storage characteristics and/or photoresponsiveness of the desired photoconductive composition.

Among the polymers which can be used in the synthesis of the photoconductive compositions of this invention include poly(N-vinylcarbazole); poly(N-acrylylcarbazole); poly(N-acrylyl-3-dimethylaminocarbazole); poly(9-$\Delta^3$-butenylcarbazole); poly(alkyl-N-carbazole siloxane); and copolymers thereof. The backbone of carbazole functional polymers used in this synthesis can also contain non-carbazole containing structural units. Such non-carbazole functional structural units can be contributed by such monomers as acrylic acid; methacrylic acid; methylmethacrylate, butylmethacrylate; styrene; isoprene; and copolymers thereof.

Tricyanovinylation of these carbazole functional polymers can be effected by combining one or more of such polymers and tetracyanoethylene in a solvent, such as dimethylformamide (DMF), under the appropriate conditions. Good results are obtained when the relative concentration of tetracyanoethylene is equal to about 0.5 to about three times the mole equivalent of pendant carbazole groups of the carbazole functional polymer. The equation which follows is illustrative of tricyanovinylation of poly(N-vinylcarbazole).

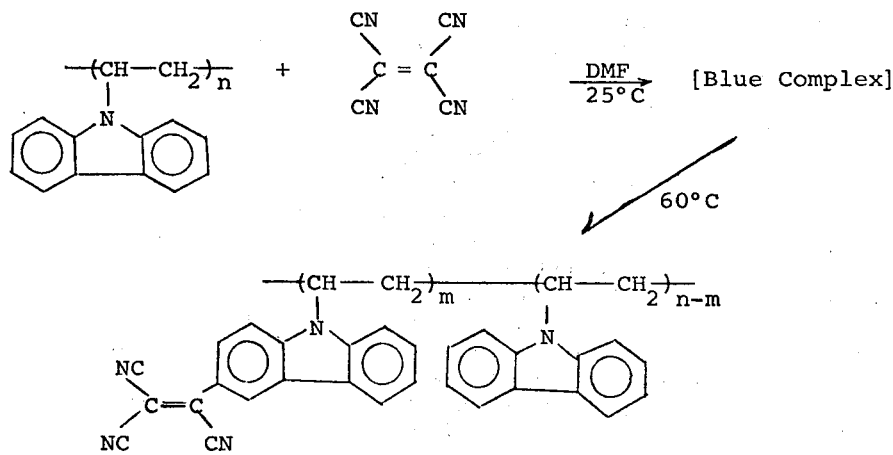

wherein n is the number of N-vinylcarbazole units of the polymer and m is about 0.1 to about 30 mole percent.

The tricyanovinylated polymer thus prepared is a solid polymeric material having an average molecular weight preferably in excess of about 15,000.

At least some of the carbazole functional polymers used in the above and similar synthesis are commercially available; however, those not so available can be readily prepared by techniques and with equipment disclosed in the technical literature.

In the above synthesis, it is generally preferred that the carbazole functional polymer and the tetracyanoethylene be prepared in separate dimethylformamide solutions; the polymeric material being dissolved in a suitable reaction vessel. The reaction vessel should be provided with a magnetic stirring bar, a reflux condenser and an addition funnel; the tetracyanoethylene solution being prepared in the addition funnel. Once the above principal reactants are in solution, the reaction vessel containing the carbazole functional polymer is purged with nitrogen and the temperature of the reaction vessel gradually increased. After the temperature of the polymer solution reaches the desired level (generally in the range of about 60° to about 140°C), the tetracyanoethylene solution is added to the polymer solution in predetermined amounts over the prescribed reaction interval. As the polymer and tetracyanoethylene interact, a highly colored metastable intermediate is formed which upon further heating ultimately dissociates thus yielding the desired product. In the event of abrupt addition of relatively large concentrations of tetracyanoethylene to the polymer, extensive complexing of the two materials will result, causing gelation and/or precipitation of the polymeric reactant. This is minimized by the gradual addition of tetracyanoethylene solution to the reaction vessel over a period which can range anywhere from a few hours to several days, depending upon the degree of substitution desired. The degree of tricyanovinylation of the poly(N-vinylcarbazole) for example, is limited in that the conditions required to effect extensive tricyanovinylation of the polymer also result in degradation of the polymer. Thus, it is generally preferred to terminate the tricyanovinylation of poly(N-vinylcarbazole) prior to degradation of the polymer into fractions having molecular weights below about 15,000. The degree of tricyanovinylation occasioned during such synthesis will, therefore, be directly dependant upon the molecular weight of the carbazole functional polymer; since the higher the molecular weight of the carbazole functional polymer used in such synthesis the longer the period required to cause its degradation into lower molecular weight fractions and, thus, the greater the number of the carbazole functional units which will undergo tricyanovinylation. Other factors, such as time, temperature and rate of addition of the tetracyanoethylene to the reaction vessel can effect the degree of modification of the carbazole functional polymer as well as the physical properties of the product obtained. Under certain conditions, even the solvent within which the above reactants are combined can effect the relative rate of formation of the desired product. For example, when the carbazole functional polymer and tetracyanoethylene are combined in a solvent, such as tetrahydrofuran or trichloroethane, the intermediate formed during the interaction of the polymer and the tetracyanoethylene is relatively stable and thus the desired reaction product forms somewhat more reluctantly. In contrast to the above, when the same reactants are combined in the solvent, dimethylformamide, the intermediate formed readily dissociates to the desired product.

Reaction of the carbazole functional polymer and the tetracyanoethylene can be carried out at temperatures in the range of from about 60° to about 140°C. In the event that an increase in the rate of reaction is desired, the contents of the reaction vessel can be pressurized and thus the boiling point of the solvent elevated, allowing the reaction to proceed at a somewhat accelerated pace.

In order to insure uniform mixing of the polymer and the tetracyanoethylene solutions, the contents of the reaction vessel are maintained in a constant state of mild agitation.

As indicated previously, it is generally preferred that the reaction vessel be purged of air prior to the addition of the tetracyanoethylene solution to the polymer solution. This can be readily achieved by purging the reaction vessel with an inert gas, such as nitrogen.

Upon completion of the addition of tetracyanoethylene to the reaction vessel and its interaction with the polymer to the extent desired, agitation of the reaction mass ceases and the contents of the vessel are allowed to cool to room temperature. The relative viscosity of the polymeric materials contained within the vessel appears somewhat greater than initially observed and little if any gelation of the polymer has occurred. In the event that some precipitate is present within the reaction vessel, it is removed by filtration. The polymeric composition is then separated from the reaction medium by precipitation with a lower alkyl alcohol, such as methanol, the polymer solids collected by filtration and residual solvent removed therefrom under a vacuum. The polymer can then be further purified by repeated dissolution and reprecipatation.

The polymeric composition thus prepared can be formed into substantially uniform coherent and adherent films on any suitable substrate by standard coating and film forming techniques. After applying a coating of such material to a substrate, the resultant film is allowed to dry until substantially free of residual solvent.

The vehicle used in the dissolving of this polymeric material in preparation of such films can be toluene, cyclohexanone, tetrahydrofuran, as well as other suitable inert organic solvents or solvent mixtures. The quantity of this polymer solution which can be applied to such substrates need be carefully monitored to insure that the resulting deposit is coherent and forms a substantially uniform film on the supportive member. Generally, film thickness is controlled in a dip coating type application by adjustment of the viscosity of this solution and/or by control of the temperature and humidity of the post coating environment. In the event that the polymeric layer is prepared by solvent casting of the polymer solution on a supportive member, mechanical means can also be used in addition to adjustment in viscosity to control the film thickness of the photoconductive film. For example, the use of a doctor blade having a wet gap setting of about 0.005 inches to assist in spreading the dispersion over such a substrate will insure that the film thickness of the imaging layer will not exceed about 15 microns. Photoconductive films prepared from these polymeric compositions having thicknesses in the range of from about 1 to about 50 microns are useful in electrophotographic imaging members.

Virtually any of the traditionally employed conductive self supporting substrates used in the preparation of electrophotographic imaging members can be operatively associated with the photoconductive films prepared as described above. Typical of the materials which can be satisfactorily used in preparation of such imaging members include aluminum; chromium; stainless steel; brass; copper; beryllium copper; their respective alloys; polyethyleneterephthalate (Mylar) coated with a thin aluminum film; and a glass substrate having a thin coating of tin oxide.

The photoconductivity of such films is evaluated by standard xerographic discharge techniques (a) using continuous white light; (b) using a pulsed light; (c) and in a sandwich cell type configuration using continuous monochromatic radiation. As a result of such evaluation, it appears that the films of these photoconductive compositions exhibit good spectral response at wavelengths in the range of from about 4200 to about 6200 A and have a photoresponsiveness comparable to commercially available poly(N-vinylcarbazole) photoconductors.

Photoconductive imaging members prepared as described above can be used in electrophotography, and, more specifically are suitable in electrostatographic imaging. In a typical electrostatographic process, the surface of the photoconductive imaging layer is sensitized with a corona electrode by the application of substantially uniform electrostatic charge to said surface. This charge can then be selectively dissipated by illumination of the charged surface in imagewise configuration with activating electromagnetic radiation, thus forming a latent electrostatic image on the imaging surface. The resulting latent image is rendered visible by development with electroscopic toner materials having a polarity opposite of that of the latent image. The development of said image can be performed either directly on the photoconductive layer or the latent image transferred to a receiving sheet where it is thereafter developed.

In certain operational environments, it may be advantageous for such an imaging member to be provided with an interfacial barrier layer disposed intermediate between the imaging layer and the conductive substrate. This type of barrier is intended to provide a blocking contact so as to prevent premature injection of charge carriers from the conductive substrate into the photoconductive imaging layer, and thus improve its charge storage capacity. A second technique used in improving the charge storage capability of such an imaging member is to provide said member with an insulating overcoating. Such insulating overcoating should be of a thickness sufficient to support the surface charge without undergoing dielectric breakdown. Generally, the resistivity of such an overcoating and the barrier layer should be in excess of about $10^{10}$ ohm - centimeters.

The Examples which follow further define, describe and illustrate preparation, use and evaluation of the photoconductive compositions of this invention. The apparatus, process conditions and techniques used in such preparation and evaluation are presumed to be standard or as hereinbefore described. Parts and percentages appearing in these Examples are by weight unless otherwise specified.

EXAMPLE I

Preparation of tricyanovinylated poly(N-vinylcarbazole)

The N-carbazole functional polymer which is tricyanovinylated according to the procedures set forth hereinafter is a commercially available product marketed by Badishe Anilin-und Sodafabrick A. G., Ludwigshafen/Rhein under the registered trademark "Luvican".

A solution comprising 20 grams of poly(N-vinylcarbazole) average molecular weight 205,000 and molecular weight distribution 4.2 - in 400 milliliters dimethylformamide (DMF) is placed in 1 liter three neck round bottom flask equipped with a nitrogen inlet, a magnetic stirring bar, a thermometer, a reflux condenser and an addition funnel. A second solution comprising 38.5 grams tetracyanoethylene in 150 milliliters DMF is prepared and placed in the addition funnel. The flask containing the polymer solution is purged with nitrogen, heated to about 60°C under a nitrogen blanket and the tetracyanoethylene solution added in equal increments over a four day period. The contents of the flask are maintained under a blanket of nitrogen at the above temperature and in a constant state of mild aggitation during the four day interval. At the end of the four day period, heating ceases and the contents of the flask are allowed to cool to room temperature (~20°C). Polymeric solids are recovered from the flask by precipitation with methanol followed by filtration. Residual DMF is removed from the recovered polymer solids by drying overnight in a vacuum oven at 25°C. The dried polymer solids are then repeatedly reprecipitated from water and methanol in a Waring blender for removal of colored impurities.

Analytical results of such synthesis are as follows:
Yield: 23 grams
Average Mol. Wt.: 52,000 (as determined by gel permeation chromatography)
Molecular Wt. Distribution: 2.1
THF 484 nm ($\epsilon$ 1.4 × $10^4$)
$\lambda_{max}$
Degree of tricyanovinylation 14.9%
(based upon No. of N-carbazole functional groups)

The polymeric composition prepared as described above is then dissolved in a series of toluene/cyclohexanone (4:1) solution and cast on scrubbed aluminum plates. The relative concentration of polymeric composition in the casting solvent is varied so as to enable preparation of photoconductive films of differing thickness. These films are allowed to dry overnight at room temperature and then placed in a vacuum chamber at 110°C for 1 hour for further removal of residual solvent. The photoconductive films thus prepared have a dry film thickness in the range of from about 5 to about 25 microns. These films are then evaluated for spectral sensitivity, and their rate of photodischarge determined by traditional xerographic techniques. The spectral response of such films are in the range of from about 4200 to 6200 A with a peak sensitivity at about 4960 A. The rate of photoinduced discharge of a positive and negative surface potential of this composition is comparable to commercial poly(N-vinylcarbazole) photoconductors (available from IBM Corporation, Armonk, N.Y.).

EXAMPLE II

A photoconductive film is prepared from poly(N-vinylcarbazole) which has been activated with about 5 mole percent tetracyanoethylene. Thin films of this material are cast on scrubbed aluminum plates and cured as described in Example I. Photoconductive films of thicknesses equivalent to those obtained in Example I are evaluated with regard to spectral response and rate of photoinduced discharge; the results of such evaluation being compared to photoconductive films wherein approximately 5% of the pendant N-carbazole groups have been tricyanovinylated. The peak spectral response of poly(N-vinylcarbazole) activated with tetracyanoethylene occurs at about 6000 A and, thus, its photoresponsiveness is evaluated at that wavelength. The rate of photoinduced discharge for a positive potential and a negative potential for both types of materials are shown in FIG. 1. Since tetracyanoethylene is highly reactive, the resulting system is unstable in the sense that it is continually undergoing change in its electrical properties because of the formation of addition materials within the bulk of the film.

Table I which follows, provides data which demonstrates the relative superiority of the compositions of this invention over the more traditionally activated photoconductive polymer systems. In each instance, the specific photoconductive material was evaluated using standard xerographic techniques.

the surface charge is selectively dissipated in the light struck areas thus forming a latent image. The latent image is then rendered visible by development with colored electroscopic toner particles and the toner image is permanently affixed to said receiving sheet by thermal fusion. The imaging member is then cleaned of residual toner, the charge pattern remaining on its surface (if any) neutralized by a corona of an opposite polarity and the imaging sequence repeated once again. The reproductions prepared by the above method are evaluated visually and are deemed to be of acceptable quality.

EXAMPLE IV

The N-carbazole functional polymer which is tricyanovinylated according to the procedures specified hereinafter is poly(N-acrylyl-carbazole). This polymer can be prepared as described in U.S. Pat. No. 3,307,940 (Example Ib) which is hereby incorporated by reference. An ethyl magnesium bromide solution is initially prepared from 5.3 grams magnesium and 24 grams ethyl bromide in 200 milliliters of ether. A suspension comprising 33.4 grams carbazole in 120 milliliters of absolute benzene is combined with the ethyl magnesium bromide solution and the homogenous solution thereby obtained heated to boiling for about one hour under reflux conditions. This solution is allowed to cool and a solution comprising 18.2 grams of acrylic acid chloride dissolved in 30 milliliters absolute ether gradually added thereto. In order to facilitate reaction of the materials present therein, the combined solution is stirred continually for 2 hours at room temperature (approximately 20°C). The polymeric reaction product - poly(N-acrylyl carbazole) - precipitates out of solution and is recovered therefrom by filtration. These polymer solids are subsequently washed in methylene chloride/petroleum ether for removal of unreacted residues and then dried.

The carbazole functional polymer thus prepared is

TABLE I

| Photoconductive Composition | Wavelength of Activating Electromagnetic Radiation (nm) | Film Thickness ($\mu$) | Initial Surface Potential (V) | Rate of Photodischarge ($dV/dt/\mu$) ($V/sec/\mu$) | Photon Flux (Photon/Sec/$cm^2$) |
|---|---|---|---|---|---|
| 5 mole % Tricyanovinylated | White Light | 10 | +800 | 3700 | — |
|  |  | 10 | −225 | 500 | — |
| Poly(N-vinylcarbazole) | 490 | 10 | +750 | 400 | $1.8 \times 10^{14}$ |
|  | 490 | 10 | −300 | 2.5 | $1.8 \times 10^{14}$ |
| 5 mole % Tetracyanoethylene in Poly(N-vinylcarbazole) | White Light | 10 | +300 | 143 | — |
|  |  | 10 | — | — | — |
|  | 600 | 10 | +300 | 7 | $1.9 \times 10^{14}$ |
|  | 600 | 10 | — | — | — |
| 5 mole % Tetracyanoethylene in Poly(N-vinylcarbazole) after 3 days of aging | White Light | 10 | +250 | 130 | — |
|  |  | 10 | −250 | 300 | — |
|  | 600 | 10 | +250 | 5.0 | $1.9 \times 10^{14}$ |
|  | 600 | 10 | −250 | 4.0 | $1.9 \times 10^{14}$ |

It is noteworthy that the electrical properties of the traditionally activated system are unstable. No comparison was possible with the more extensively tricyanovinylated systems of this invention, since tetracyanoethylene doping of poly(N-vinylcarbazole) at an excess of 5% concentration was not technically feasible.

EXAMPLE III

An imaging member having a photoconductive insulating layer of the compositions of the films of Example I is charged to a positive potential of about 600 volts in the dark, exposed to a light and shadow image whereby reacted with tetracyanoethylene under the conditions set forth in Example I. The concentration of tetracyanoethylene used in such synthesis is three times the mole equivalent of the carbazole functional groups present on this polymer.

EXAMPLE V

The carbazole functional polymer which is tricyanovinylated according to the procedures specified hereinafter is poly(N-acrylyl-3-dimethylaminocarbazole). This polymer can be prepared in the manner described in Example IV, by the mere substitution of 3-dimethylaminocarbazole for the unsubstituted carbazole.

The polymer product thus attained is reacted with tetracyanoethylene under the conditions set forth in Example I. The concentration of tetracyanoethylene used in such synthesis is three times the mole equivalent of the carbazole functional groups present on this polymer.

EXAMPLE VI

The carbazole functional polymer which is tricyanovinylated according to the procedures specified hereinafter is poly(9-$\Delta^3$-butenylcarbazole). The monomer of this polymer is synthesized by initially preparing a sodium carbazole salt. This salt is prepared by combining a solution of 4.1 grams carbazole in 30 milliliters tetrahydrofuran and a second solution comprising 1.4 grams sodium hydride in 30 milliliters tetrahydrofuran. The resulting solution containing the sodium carbazole salt is then transferred to an addition funnel and added dropwise to a dispersion of 54 grams 1,4-dibromo-butane in 25 milliliters tetrahydrofuran. This mixture is maintained at a temperature of 70° to 75°C and continually agitated during the addition of the sodium salt. After all the sodium carbazole has been added, the resulting mixture is stirred and heated for an additional 18 hours. This mixture is than allowed to cool to room temperature, poured into 500 milliliters of water, extracted with three 60 milliliter portions of ether and the combined ether extracts dried over anhydrous magnesium sulfate. The ether, along with the unreacted residues (e.g. 1,4-dibromobutane) are removed by vacuum distillation and the solid residues recrystallized from 300 milliliters of methanol to yield about 6.2 grams of a pale yellow solid. These solids are further purified by vacuum sublimation (130°C, 0.1 mm Hg) thus yielding a product identified as 9(4-bromobutyl) carbazole, melting point 105°–106.5°C.

A mixture comprising 12.08 grams 9(4-bromobutyl) carbazole, 20 milliliters dioxane and 20 milliliters dimethylamine are placed in a glass tube, the tube sealed and heated in a steam cone for 12 hours. The contents of the tube are thereafter poured into 120 milliliters of water and extracted with three 40 milliliters portions of benzene. The combined benzene extracts are dried over anhydrous magnesium sulfate and then saturated with anhydrous hydrogen chloride thus forming a heavy oily substance. This oily material is dissolved in a basic aqueous solution (sodium hydroxide), extracted with three 40 milliliters portions of ether and the combined ether extracts dried as above. The solvent is then evaporated and the residues chilled with dry ice to induce crystallization. These crystals, identified as 9(4-N,N'-dimethylaminobutyl) carbazole, have a melting point of about 45.5°–46°C.

To a solution of 6.7 grams 9(4-N,N'-dimethylaminobutyl) carbazole in 55 milliliters absolute methanol is added 30 milliliters of 30 percent hydrogen peroxide and the resulting solution is allowed to stand at room temperature. An additional 30 milliliters of 30 percent hydrogen peroxide is added after one hour and then again after five hours from the time of initial preparation of the solution. The reaction mixture is allowed to stand until it tests negative with alcholic phenolphthalein. The excess peroxide is decomposed with 10 percent palladium on charcoal, (observing extreme care so as to avoid explosion of the peroxide), the mixture filtered and the solvent extracted. The amine oxide remaining, 9-(4-N,N'-dimethylaminobutyl) carbazole oxide, is redish in color and has the consistency of a viscous syrup.

The oxide (not purified) is placed in a 100 milliliter round bottom flask connected to a dry ice acetone trap, the system evacuated to 0.1 mm Hg and the flask slowly heated in an oil bath. After initial vigorous decomposition of the contents of the flask, the flask temperature is elevated to 150°C and maintained at this level for about 30 minutes. The residue remaining in the flask is thereafter allowed to cool, the solids lodged in the trap dissolved in 16 milliliters of ether, washed successively with 10 percent hydrochloric acid, 5 percent sodium bicarbonate and water, and then dried over anhydrous magnesium sulfate. The solvent remaining in the reaction product is removed by evaporation thus leaving an oily residue which is chilled in dry ice to induce crystallization. The resulting solids are crystallized from methanol which upon cooling to minus 78°C yields 4.2 grams of product. NMR spectral analysis confirms the product is 9-$\Delta^3$-butenylcarbazole. This monomer is then readily polymerized by standard cationic polymerization techniques.

The polymer product thus obtained is reacted with tetracyanoethylene under the conditions set forth in Example I. The concentration of tetracyanoethylene used in such synthesis is three times the mole equivalent of the carbazole functional groups present on this polymer.

What is claimed is:

1. A photoconductive polymer of the formula

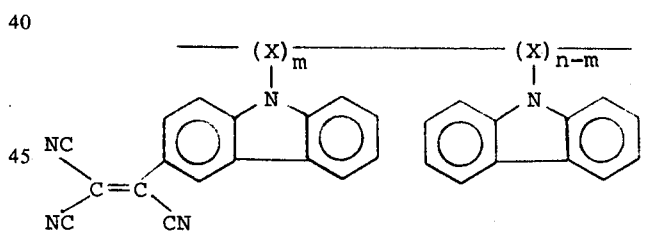

wherein
X is a structural unit of the backbone of the photoconductive polymer;
$n$ is the total number of N-carbazyl groups pendant from the backbone of the photoconductive polymer; and
$m$ is at least 0.1 percent of the number of N-carbazyl functional groups pendant from the backbone of the photoconductive polymer.
2. The copolymer of claim 1 wherein X is vinyl.
3. The copolymer of claim 1 wherein X is acrylyl.
4. The copolymer of claim 1 wherein X is siloxane.
5. The copolymer of claim 1 wherein X is butenyl.

* * * * *